United States Patent
Stadel et al.

[11] Patent Number: 6,128,590
[45] Date of Patent: Oct. 3, 2000

[54] METHOD FOR THE MIGRATION OF HARDWARE-PROXIMATE, SUBPROGRAM-INDEPENDENT PROGRAMS WITH PORTABLE AND NON-PORTABLE PROGRAM PARTS

[75] Inventors: Manfred Stadel, München; Christian Weber, Poing, both of Germany

[73] Assignee: Siemens Nixdorf Informationssysteme Aktiengesellschaft, Paderborn, Germany

[21] Appl. No.: 09/214,335

[22] PCT Filed: Jun. 16, 1997

[86] PCT No.: PCT/DE97/01220

§ 371 Date: Jan. 4, 1999

§ 102(e) Date: Jan. 4, 1999

[87] PCT Pub. No.: WO98/01805

PCT Pub. Date: Jan. 15, 1998

[30] Foreign Application Priority Data

Jul. 9, 1996 [DE] Germany .................. 196 27 666

[51] Int. Cl.⁷ ............................................. G06F 9/455
[52] U.S. Cl. ........................ 703/27; 703/26; 712/234; 717/8
[58] Field of Search ..................... 703/27, 26, 23; 710/73; 712/234; 717/5, 8, 11

[56] References Cited

U.S. PATENT DOCUMENTS

| | | | |
|---|---|---|---|
| 5,621,651 | 4/1997 | Swoboda | 703/23 |
| 5,841,670 | 11/1998 | Swoboda | 703/23 |
| 6,041,374 | 3/2000 | Postman et al. | 710/73 |

FOREIGN PATENT DOCUMENTS

| | | |
|---|---|---|
| 0 372 835 A2 | 6/1990 | European Pat. Off. . |
| 0 716 375 A2 | 6/1996 | European Pat. Off. . |
| 1 324 154 | 7/1973 | United Kingdom . |
| WO 92/15961 | 9/1992 | WIPO . |

OTHER PUBLICATIONS

S. Goel et al., Supporting Method Migration in a Distributed Object Database System: A Performance Study, Proceedings of the 29th Hawaii Int'l Conference on System Sciences, vol. 1, 1996, pp. 31–40.

T. Afzal et al., Motorola PowerPC Migration Tools—Emulation and Translation, Technologies for the Information Superhighway, Compcon '96, Digest of Papers, 1996, pp. 145–150.

(List continued on next page.)

Primary Examiner—Kevin J. Teska
Assistant Examiner—Russell W. Frejd
Attorney, Agent, or Firm—Hill & Simpson

[57] ABSTRACT

The method is for moving hardware-proximate and subprogram-independent program code. Portable program parts (C, D) for the destination hardware are respectively recompiled and all entry points at which these program parts can be branched to proceeding from other program parts are identified. A specific bit pattern (NOP) is respectively generated at these entry points, this bit pattern representing, on the one hand, a dummy command of the destination hardware but, on the other hand, not representing a valid operation for the source hardware. Moreover, program code is generated at all potential exit points of non-local branchings, this program code checking the branch destination of the corresponding branch at the run time to see whether the specific bit pattern (NOP) is present thereat. When this is not the case, an emulator (EM) is activated that emulates the program part branched to and consequently present as non-portable code (A, B) for the source hardware on the destination hardware. A check is likewise carried out in the emulation at all potential non-local branches to see whether the specific bit pattern (NOP) is present at the destination address and the emulation is ended as warranted.

2 Claims, 3 Drawing Sheets

OTHER PUBLICATIONS

F. Gabbay et al., Smart: An Advanced Shared–Memory Simulator—Towards a System–Level Simulation Environment, Proceedings 5th Int'l Symposium on Modeling, Analysis, and Simulation of Computer and Telecommunications Systems, 1997, MASCOTS '97, pp. 131–138.

Z. Jing et al., Migration of Legacy WSR–8D Algorithms and Product Generators to the Open System RPG, Proceedings of the IEEE 1997 National Aerospace and Electronics Conference, NAECON, 1997, vol. 1, pp. 318–324.

K. Chanchio et al., Memory Space Representation for Heterogeneous Network Process Migration, Proceedings of the 1st Merged Int'l Parallel Processing Symposium and Symposium on Parallel and Distributed Processing, IPPS/SPDP, 1998, pp. 801–805.

M. Eisenring et al., Rapid Prototyping of Dataflow Programs on Hardware/Software Architectures, Proceedings of the 31st Hawaii Int'l Conference on System Sciences, vol. 7, 1998, pp. 243–252.

M. Eisenring et al., Domain–Specific Interface Generation from Dataflow Specifications, Proceedings of the 6th Int'l workshop on Hardware/Software Codesign, (CODE/CASHE '98), 1998, pp. 43–47.

Andrews, Kristy et al, Migrating a CISC Computer Family onto RISC via Object Code Translation, ACM Sigplan Notices, vol. 27, No. 9, (1992), pp. 213–222.

Communications of the ACM, vol. 36, No. 2, (1993), Sites et al, "Binary Translation", pp. 69–81.

METHOD FOR THE MIGRATION OF HARDWARE-PROXIMATE, SUBPROGRAM-INDEPENDENT PROGRAMS WITH PORTABLE AND NON-PORTABLE PROGRAM PARTS

The invention is directed to a method for the migration of hardware-proximate, subprogram-independent program code present for a source hardware into a program code for a destination hardware with an architecture deviating from the source hardware, the program code to be migrated is composed of portable and non-portable program parts.

The increasing demands made of the performance capability of computer systems of any size often require the change to new computer generations, for example to computers having RISC architecture. However, in order to be able to utilize the higher performance capability of these computers without thereby having to forego the extensive and valuable software base that already exists, a transfer of the existing programs for operating systems, applications, voice compilers, etc., is necessary. The parts of these programs present in the source code of a standardized language can usually be migrated onto the new computer (referred to here as destination hardware, by simple recompiling). The hardware-dependent program parts written, for example, in assembler language, by contrast, must either be transformed into corresponding program code for the destination hardware by complicated methods on the assembler or object code level or must be implemented on the new computer at the running time in the framework of an emulation. What is thereby disadvantageous is that the execution speed of a program under an emulation usually turns up many times slower and given the same program recompiled for the destination hardware. Since a majority of the components of a program can be transferred onto destination hardware by recompiling, it is desirable to combine these portable program parts as well as the remaining hardware-specific program parts such to form a program code runnable on the destination hardware that only the non-portable parts of the program must be subjected to an emulation—Kristy Andrews et al., "Migrating a CISC Computer Family onto RISC via Object Code Translation", ACM SIGPLAN NOTICES, 27 (1992), September, No. 9, New York, US, pages 213 through 222.

Previous methods known, for example, from R. L. Sites, A. Chernoff, M. B. Kirk, M. P. Marks, S. G. Robinson, Binary Translation, Comm. ACM, Vol. 3, No. 2, February 1993, are usually based on one of the two following approaches:

1) What are referred to as "shelling" routines are manually implemented for recompiled sub-programs that should be capable of being directly called in the runnable program by non-portable program parts present as code for the source hardware. At the one time of the migrated program code, these routines then undertake all conversions, switchings, etc., needed for changing the program flow from the recompiled to emulated program parts (or, respectively, vice versa). What is thereby disadvantageous is the usually substantial programming outlay for the implementation of the "shelling" routines.

2) The program parts that are to be emulated and are written in the code of the source hardware are deposited on the destination hardware in specifically protected memory areas, and the recompiled program parts are deposited in correspondingly unprotected areas. When a branch from a recompiled program part into a program part stored in a protected manner in the code of the source hardware then ensues at the run-time, then a signaling (usually a hardware interrupt) is triggered and, thus, an emulator is called that implements the corresponding program part that has been branched to. The emulation is then in turn ended as soon as an address jumps into the course of the program that lies in the unprotected memory area and, thus, belongs to the program code recompiled for the destination hardware.

For this method, the destination hardware (such as, for example, a DEC-alpha hardware) must offer the possibility of protecting specific memory areas such that the attempt to interpret a data sequence stored therein as command sequence and to implement it leads to a signaling. This, however, is far from being the case given every computer. What is thereby also disadvantageous is that the switch between direct implementation and emulation (usually an interrupt handling) that ensues given every change between a recompiled and an emulated program part turns out comparatively clearly slower than a direct activation of the emulation.

The French publication FR-A2 122 802 (corresponds to GB1324154) already discloses in this context that non-portable, standard subprograms of the program code of the source hardware or parts thereof be replaced by an invalid command with which a switch is then made into a subprogram of the destination hardware that effects the same result, whereby the last command of the subprogram effects the return into the program code of the source hardware to be migrated.

SUMMARY OF THE INVENTION

An object of the invention is to develop the idea underlying this known method such that it can be more advantageously applied under given boundary conditions.

The new solution thereby relates to hardware-proximate, subprogram-independent source code such as, for example, assembler that, in addition to comprising entry points for subprograms, usually comprises a number of further entry points that stem therefrom that one is not forced to divide a program into subprograms in the sense of a higher programming language when programming in assembler. The entry points also include, for example, return points after subprogram branches that are branched to by an indirect branch instruction. All of these entry points are found and identified. A bit pattern or a command that is not provided in the set of commands for the source program code, further, is in fact also employed for the identification of these entry points; this bit pattern, however, subsequently acts on the destination hardware as a dummy command that does not produce an operation. Given assembler programs, that has the advantage that no specific measures whatsoever for handing over these bit patterns need be undertaken at the many possible entry destinations in the inside of the assembler program that are simply run through in the normal course of this program. An additional processor clock is merely required therefor.

According to the development of the invention, program parts, for example specific routines, from a library are also incorporated into the migrated program code runnable on the destination hardware, these program parts not deriving from the recompiling of portable program codes for the source hardware but being already present in the form of object code for the destination hardware and therefore not containing the specific bit pattern. These program parts are transferred into the runnable program code in that they are provided with corresponding "shelling" routines that produce the linkage to the recompiled or, respectively, emulated program parts. The incorporation of such program parts already present as code for the destination hardware is particularly advantageous when it is thereby a matter of routines, for example mathematical routines, specifically optimized for the destination hardware with which the corresponding routines in the code of the source hardware are replaced. The employment of equivalent routines from a corresponding library for the destination hardware is also expedient in case standard library routines are called in the source code that are implemented on the source hardware as non-portable code.

Shown are:

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the appompanying drawings, in the several Figures of which like reference numerals identify like elements, and in which:

DESCRIPTION OF THE PREFERRED EMBODIMENTS

Figure 1:
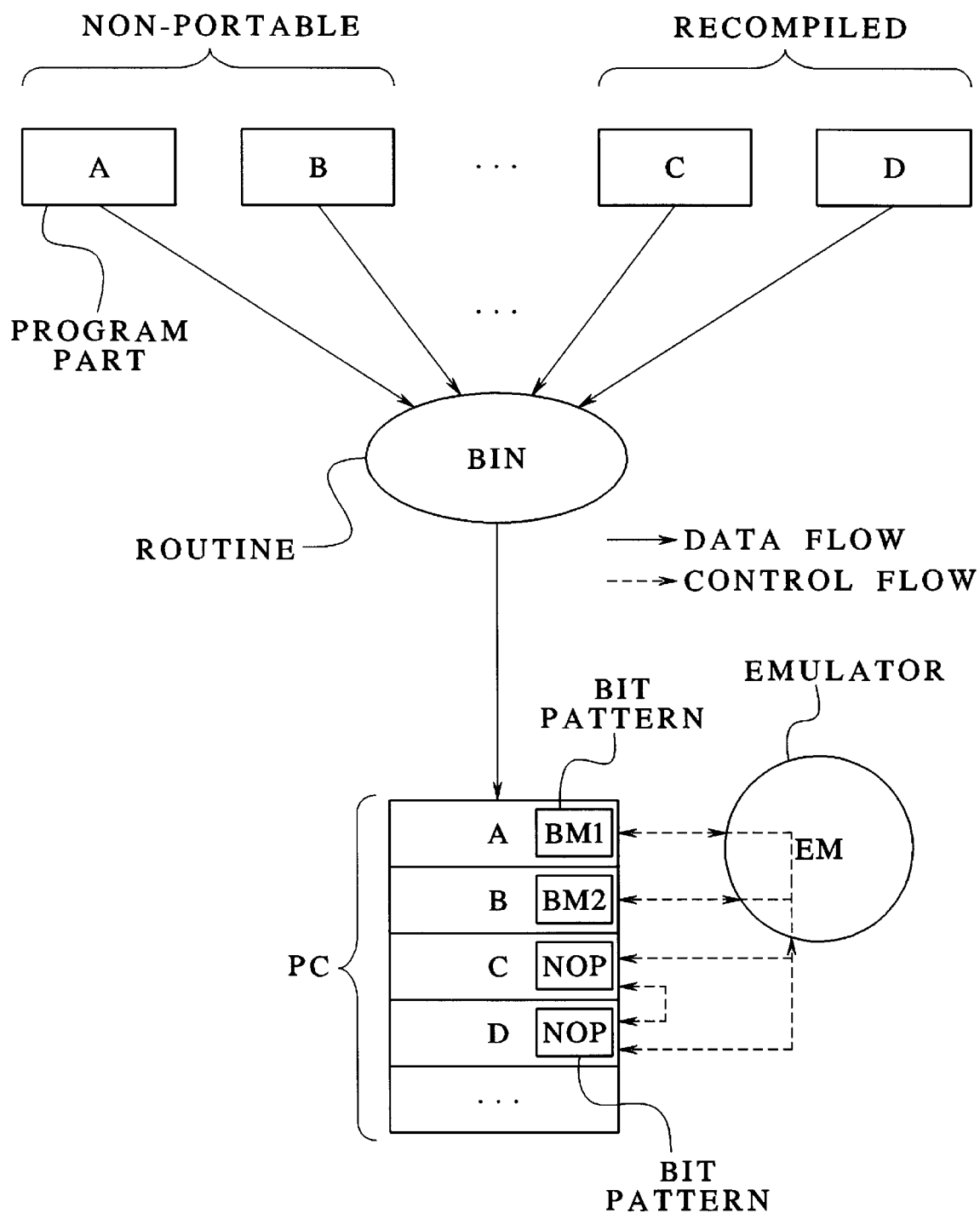
FIG. 1 Schematically, the linkage of non-portable and portable program parts to form a program code runnable on the destination hardware.

The basic principle of the inventive method for migration is shown in FIG. 1 by way of example for a program comprising four program parts A, B, C, D: the two program parts A and B are thereby not portable onto the destination hardware because, for example, no source code is present for them in a portable standard language. The two other program parts C and D, by contrast, are portable and are therefore translated (recompiled) for the destination hardware according to the invention. In the recompiling, all potential entry points for branches into the portable program parts are identified, and a specific bit pattern NOP is respectively inserted in the translated code at these locations. Interpreted as command, this bit pattern NOP represents a dummy command on the destination hardware but does not represent a valid instruction on the source hardware. In the migration of the program for the source hardware, all four program parts A, B, C, and D are connected by a montage routine (binder) BIN to form a program code PC runnable on the destination hardware, an emulator EM for the emulation of the two program parts A and B present in the code of the source hardware on the destination hardware being attached thereto as well. When, during the running time of the migrated program code PC, the control flow changes from a recompiled program part C or D to a program part A or B taken directly from the source hardware, then the specific bit pattern NOP that, of course, is not allowed at all in the code of the source hardware is not present at the point that has been branched to; rather, another bit pattern BM1 or, respectively, BM2 is present thereat. After checking the bit pattern found at the branch destination, accordingly, the emulator EM is called in order to execute the non-transported program part A or, respectively, B that has been branched to. The emulation is continued until a branching of the control flow ensues to a branch destination at which the specific bit pattern NOP is present. The program part that has been branched to, consequently, is a matter of recompiled program code C or, respectively, D that is implemented directly on the destination hardware without emulation.

Figure 2:
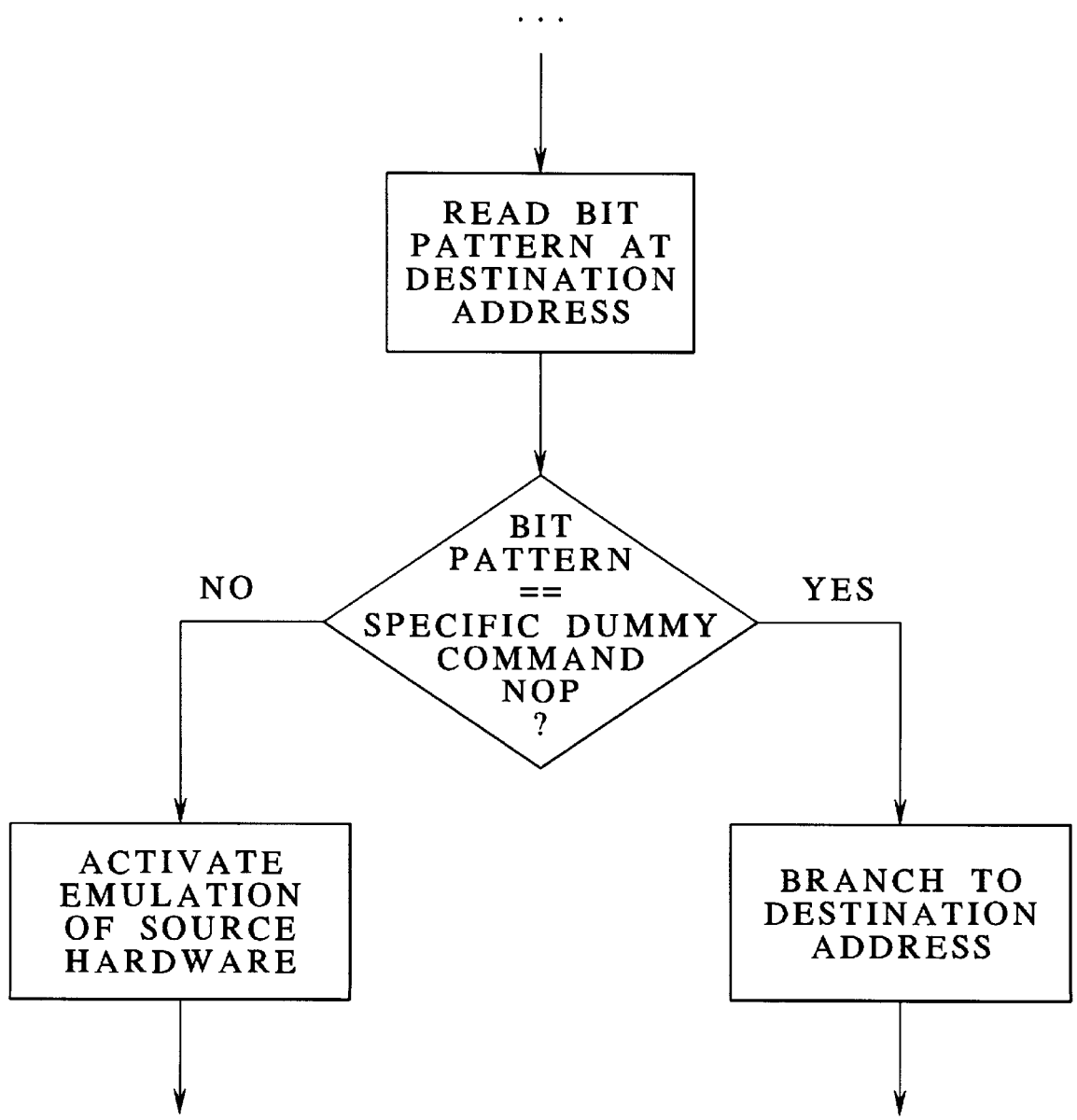
FIG. 2 A flow chart for the control of the program flow given a non-local branch from a recompiled program part.

With reference to a flow chart, FIG. 2 shows the course of the control flow in the implementation of the migrated program code PC on the destination hardware in case of a non-local branch from a recompiled program part C or, respectively, D. The bit pattern present at the destination address is read and checked for coincidence with the specific bit pattern NOP. When the two bit patterns are identical, then the branch to the indicated branch destination ensues, this then lying in a recompiled program part C or, respectively, D. Otherwise, the branch destination is located in a program part A or, respectively, B transferred from the source hardware and the emulation is consequently activated.

Figure 3:
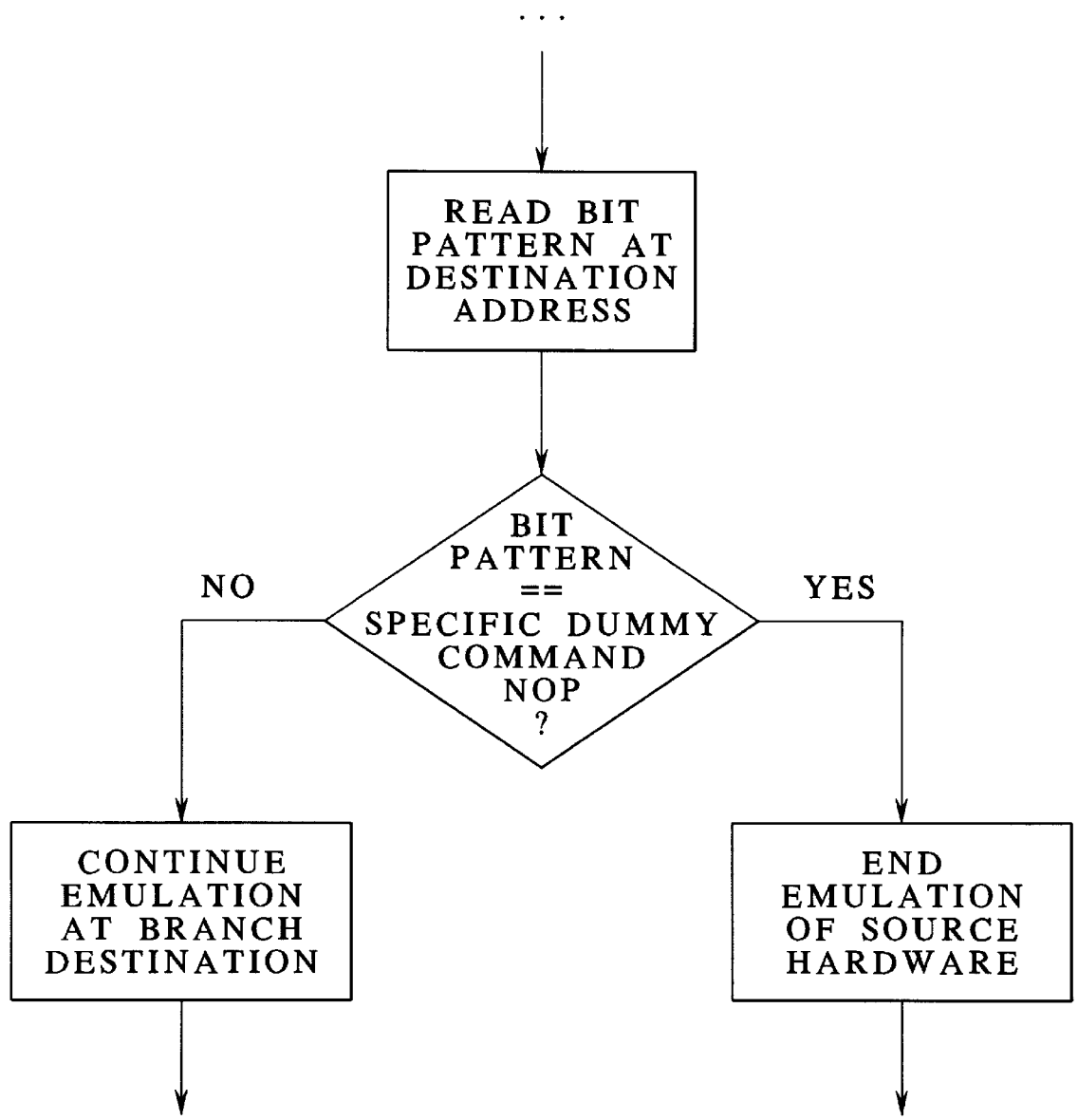
FIG. 3 A flow chart directed to the control of the program flow given a non-local branch from an emulated program part.

The opposite case for the course of the control flow given a non-local branch from an emulated program A or, respectively, B is shown in FIG. 3. When the specific bit pattern NOP is present at the branch destination, and the program part that has been branched to is a matter of recompiled code C or, respectively, D, and the emulation can therefore be ended. Otherwise, the program part that has been branched to must likewise be emulated.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for moving hardware-proximate and subprogram-independent program code for a source hardware into a program code for a destination hardware having an architecture deviating from an architecture of the source hardware, the program code to be moved being composed of portable and non-portable program parts, comprising the steps of:

translating the portable program parts into code for the destination hardware; and, thereby identifying all possible entry points at which said portable program parts are branchable to proceeding from other program parts;

generating a specific bit pattern in said portable program parts at all such entry points, said specific bit pattern representing a dummy command of the destination hardware without yielding a valid operation for the source hardware;

generating program code that, at run time on the destination hardware, checks a branch destination of a corresponding exit to determined if the specific bit pattern is present at all potential exit points of non-local branchings leading out from one of said portable program parts, and, if the specific bit pattern is not present, activating an emulator that emulates the non-portable program part on the destination hardware that has been branched to and that is consequently present as non-portable code for the source hardware; and carrying out a check to determine if the specific bit pattern is present at a destination address in the emulation given all potentially non-local exits from an emulated program part and, if the specific bit pattern is present, ending the emulation.

2. The method according to claim 1, wherein program parts are transferred that are present in the program code executable on the destination hardware as object code for the destination hardware and that do not proceed from the translation of portable program codes for the source hardware and whose command sequences therefore do not contain the specific bit pattern, and wherein said program parts are provided with "shelling" routines that produce linkage to recompiled or, respectively, emulated program parts.

* * * * *